| United States Patent [19] | [11] | 4,190,709 |
|---|---|---|
| Hodgkin | [45] | Feb. 26, 1980 |

[54] MERCURY AND COPPER SELECTIVE METAL CHELATING RESINS

[75] Inventor: Jonathan H. Hodgkin, Burwood, Australia

[73] Assignee: Commonwealth Scientific and Industrial Research Organization, Australia

[21] Appl. No.: 908,820

[22] Filed: May 23, 1978

[30] Foreign Application Priority Data

Jun. 2, 1977 [AU] Australia ............................. PD0336

[51] Int. Cl.$^2$ ..................... B01D 15/04; C06G 14/06
[52] U.S. Cl. .................................. 521/39; 75/101 BE; 521/162; 521/163; 423/24; 423/100; 521/150
[58] Field of Search ................. 521/150, 162, 163, 39; 75/101 BE; 423/24, 101

[56] References Cited

U.S. PATENT DOCUMENTS

| 2,382,238 | 8/1945 | Laufenberg et al. ................. 528/162 |
| 2,402,384 | 6/1946 | Eastes .................................... 528/162 |
| 3,725,480 | 4/1973 | Traise et al. .......................... 528/162 |
| 3,976,571 | 8/1976 | Rio ........................................ 210/38 B |

FOREIGN PATENT DOCUMENTS

| 90 | 12/1978 | European Pat. Org. ................... 521/39 |
| 49-34997 | 3/1974 | Japan ...................................... 528/162 |
| 50-59450 | 5/1975 | Japan ...................................... 528/162 |

*Primary Examiner*—Joseph L. Schofer
*Assistant Examiner*—Peter F. Kulkosky
*Attorney, Agent, or Firm*—Bacon & Thomas

[57] ABSTRACT

Mercury and copper ions may be removed very selectively from aqueous solutions by means of a metal-chelating resin consisting of a polymer produced by the condensation of a phenolic component comprising one or more phenols, formaldehyde, and a diamino component comprising one or more di-(secondary amino) compounds under neutral conditions. The resin is prepared by condensing approximately equimolar quantities of a phenolic component comprising one or more phenols, and a diamino component comprising one or more di-(secondary amino) compounds with approximately twice the molar quantity of formaldehyde under Mannich reaction conditions.

12 Claims, No Drawings

MERCURY AND COPPER SELECTIVE METAL CHELATING RESINS

This invention is concerned with ion-exchange resins which are capable of very selective removal of heavy metal ions from aqueous solutions and methods for the synthesis of these resins. The resins of the invention are designed to selectively chelate mercury and copper ions and are particularly useful where the concentration of metal is low. They have a further advantage that the metal can be recovered easily from the resins under appropriate conditions.

Use of ion-exchange resins for the removal of metal ions from aqueous solutions is commercially wide spread; especially in water softening applications and for the removal of toxic products from effluents. Other areas of importance are in the processing of radioactive wastes and the purification of rare earth metals. Many of these commercial ion-exchange resins do have some selectivity for certain metal ions but as this is usually only by a factor of 2 or 3 it is not often of economic significance.

In an effort to improve this selectivity a considerable amount of research has been carried out in the area of chelating resins which because of their multifunctional nature have greatly improved metal selectivity for the transition metal ions over the alkali metal ions. Many chelating polymers have been synthesized and are commercially available, e.g. imidoacetic acid resins of the Dowex A-1 and Chelex 100 type ("Dowex" and "Chelex" are registered trade marks). However, most of these resins are only marginally selective for a particular heavy metal ion.

Ion-exchange resins of sufficient selectivity and cheapness have many potentially important applications. These include the removal of polluting heavy metal ions in the effluent from electroplating or metal pickling baths. Another possible application is the recovery of metals from dilute mine dump leachings where selective solvent extraction using low molecular weight chelating agents is being used commercially but problems of solvent and complexing agent loss prevent wider use of solvent extraction (G. Ciggett and W. Hopkins, Chem. & Ind. 23, 1019 (1976)). The possibility of medical use, e.g., for selective removal of poisoning metal ions, could be a welcome benefit of selective resins.

As a result of research carried out on the synthesis of highly selective ion exchange resins, a number of resins with improved selectivity for copper and mercury have been reported. These materials have generally been made by carrying out a series of chemical transformations on crosslinked polystyrene, [I. V. Sarbaskii et. al., U.S.S.R. 507, 588 (1976); L. R. Melby, *J. Amer. Chem. Soc.*, 97, 4044 (1974); R. R. Grinstead et. al., in "Extractive metallurgy of Copper" vol. 2 Yannopolous and Agarwal Eds., 1976, AIME New York pp. 1009–1024] polyethyleneimine, [A. K. Kusaiva et. al., *Izv. Akad. Nauk. Kaz. SSR, Ser. Khim.*, 26 (3), 33 (1976); Tsuchida et. al., *J. Polym. Sci., Polym. Chem. Ed.*, 14, 1557 (1975)] or poly(4-vinyl pyridine), [Hiroyuki et al., *Makromol Chem.*, 177, 2295 (1976)]. Any reaction carried out on a preformed polymer leads to the formation of some non selective or non-absorbing defect structures on the chain, which cannot then be removed. Multiple reactions compound the formation of defects considerably and hence limit the selectivity of a resin. The costs of such chemical transformations also limit greatly the applicability of the chelating resins formed.

Another type of chelating polymer has been made by direct synthesis, using the condensation of phenol, formaldehyde and iminodiacetic acid [*Japan Kokai*, 75, 92, 991 (1975) and 75, 107, 092 (1975)]. Also the condensation of polyamines, formaldehyde and 8-hydroxyquinoline [V. Balakin and V. V. Glukahikk, Iz. *Vyssh. Uchebn. Zaved, Khim, Kihm, Tekhnol*, 18 (9), 1466–9 (1975); F. Vernon, Chemistry and Industry, 634 (1977)] gives a similar chelating polymer. However, in both these cases (and in most other attempts to form chelating polymers) well-known, strong chelating structural units are used in the polymers. These powerful chelating units have precluded the development of high selectivity. Another common type of phenol/formaldehyde resin is that formed with various mono- or di-primary amines especially under acid catalysed conditions [e.g. A. Rio U.S. Pat. No. 3,976,571]. In these cases many different reactions can and do occur at the one amine group. Because of this these resins do not have high metal selectivity.

The resins of this invention are polymers produced by the condensation of a phenolic component comprising one or more phenols, formaldehyde, and a diamino component comprising one or more di-(secondary amino) compounds, under neutral (Mannich reaction) conditions.

The preferred polymers are formed from diamino compounds in which the secondary amino groups are present as part of a saturated heterocyclic ring. The two groups may be combined in a single ring, as for example in piperazine or in separate linked rings, as for example in 4,4'-bipiperidine.

The most preferred polymers are those prepared using piperazine and have the following structure, as confirmed by nuclear magnetic resonance and infrared measurements.

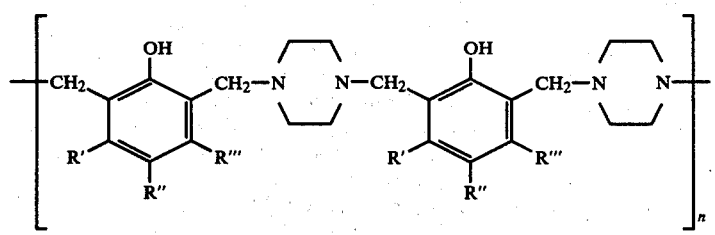

where $R'$ and $R'''$ are independently lower ($C_1$–$C_3$) alkyl groups or hydrogen atoms and $R''$ is a hydrogen atom or a crosslinking group.

The groups $R'$ and $R'''$ on adjacent aromatic rings may be the same or different. Usually only a few of the groups $R''$ will be a crosslinking group, the majority being hydrogen.

The nature of the crosslinking group will vary according to the phenol(s) selected and the degree and type of crosslinking required. The methylene crosslinking groups typical of phenol-formaldehyde resins will be present, but in addition the cross-linking groups may include methylene-piperazine or methylene-piperazine-methylene bridges. Bisphenols (including bisphenol sulphides or sulphoxides) can also be used to provide further types of cross-linking.

The strongest and most selective chelating resins are obtained when the phenol used is phenol itself (i.e. hydroxybenzene). However, the addition of small amounts of a less useful chelating but better crosslinking phenol, such as bisphenol A gives resins which are more stable to acid breakdown and mechanical attrition.

In accordance with another aspect of the invention, selective copper and mercury-chelating resins are prepared by reacting approximately equimolar quantities of phenolic and diamino components with approximately twice the molar quantity of formaldehyde under Mannich reaction conditions, for example in aqueous ethanol at reflux for 24 hours.

A more complex procedure is needed to form useful chelate resins in a highly crosslinked spherical form. In this preferred method of the invention, the phenolic and amino components, with some formaldehyde, are pre-condensed under Mannich conditions to give a linear polymer, which is then reacted under suspension polymerisation conditions with an additional quantity of the same or another phenolic component and formaldehyde, to complete polymerisation and cross-linking.

By way of example, the phenolic and amino components in approximately 1:1.2 molar quantities may be precondensed with slightly less than 1.5 moles of formaldehyde in aqueous alcohol at 70° C. for 2 hours to give a linear polymer. Then chlorobenzene and carbon tetrachloride are added with more phenol and 1 mole extra of formaldehyde and the suspension, stabilized with polyvinyl alcohol or other suitable surfactant, is heated with strong stirring for 3 hours at 120° C.

Acid-catalysed formaldehyde crosslinking of the linear polymer can also be used in the second stage to give fast crosslinking and hence good bead formation.

The polymers of the invention are cream to light brown acid insoluble resins which show strong and specific absorption for copper and mercury only, even in the presence of large excesses of other ions. In the case of copper, the strong adsorption of copper commences at about pH 3.5 on the acid side and the resin turns deep green to almost black when fully saturated with up to 1.5 mili-moles of copper/gram. The adsorption is reversible below pH 3.5 (the rate of desorption of copper increased as the pH decreased below 3.5) or at high pH in the presence of ammonia or cyanide ions. The only other ion which shows any noticeable adsorption on these resins is the mercuric ion at all pH's below 8 except in very strong acid where some desorption occurred along with resin degradation. Mercury ions could be recovered at high pH or by the use of strong chelating agents.

The invention is further described and elucidated in the following examples. These should not be construed, however, as limiting the invention in any way.

EXAMPLE 1

This example illustrates the preparation and properties of a copper and mercury chelating resin prepared from phenol, bisphenol A, formaldehyde and piperazine.

Phenol (42.3 g, 0.45 mole) and bisphenol A (11.4 g, 0.05 mole) were dissolved in ethanol (1½ liter) and piperazine hexahydrate (108 g, 0.55 mole) was added slowly with stirring. After complete addition the mixture was cooled in an ice bath and stirred while formaldehyde solution (37% formaldehyde; 100 ml, 1.2 mole) was added slowly. The mixture was then heated slowly to increase the temperature over 2 hours to a vigorous reflux with strong stirring. Some solid product started to form after about 3 hours heating but after 12 hours a further (0.3 mole) of formaldehyde solution was added slowly and the reflux was continued a further 12 hours. The solution was decanted off and the solid product washed with ethanol and then water. The resin was then soaked in 0.1 N hydrochloric acid for 24 hours which caused it to break up into small flexible particles. The resin particles were washed with 0.1 N hydrochloric acid until the washings remained transparent after basification with ammonia. This removed soluble organic material. The resin was then washed with distilled water, ammonia and distilled water again to give the free base product.

EXAMPLE 2

The selectivity of the above ion-exchange resin was measured in the following general manner. A 1 g portion of the wet resin particles were equilibrated by stirring the material in sodium acetate/acetic acid/hydrochloric acid buffer solutions of pH 2.5–7.0, containing 100 ppm of copper, zinc, cobalt and nickel salts and 50 ppm of cadmium chloride. The concentrations of the various ions were monitored by atomic absorption spectroscopy. The only significant ($>1$ ppm) quantity of ion uptake over 24 hours was for cupric ions. Above pH 4.5 this was almost complete (i.e. less than 2 ppm remaining unchelated by the dark green resin) but the uptake of copper dropped to almost nothing below pH 3.5 and copper previously adsorbed could be completely recovered at these low pH values. Similar selectivities for the mercuric ion against zinc, cobalt, nickel and cadmium were obtained, except that the range of mercury adsorption was pH 1–7.

EXAMPLE 3

Column operation, demonstrating the selectivity of the above resin, was carried out as follows. Approximately 15 gm of the resin particles were equilibrated by stirring in an aqueous sodium acetate/acetic acid buffer solution at pH 6 and then packed in a column. A buffered (pH 6) solution containing 50 ppm each of copper, nickel and zinc sulphates and 25 ppm of cadmium sulphate was passed through the column and the effluent continuously monitored by atomic absorption spectroscopy. Nickel, cadmium and zinc salts started to emerge in the 1st bed volume of eluent (25 ml) and the first two ions were emerging at full concentration (50 ppm) by the 3rd bed volume, zinc by the 6th. Significant quantities ($>1$ ppm) of copper did not emerge until the 68th bed volume (1.7 liters of solution). The copper capacity of the resin was shown to be 1.5 millimole/gram of dry resin. The copper extracted by the resin was recovered in one bed volume of basic (pH 10) sodium cyanide.

EXAMPLE 4

This example illustrates the preparation and properties of an ion exchange resin made in spherical beads.

Phenol (75.3 g, 0.8 mole), piperazine hexahydrate (196 g, 1 mole) in 50:50 aqueous ethanol (2 liters) were precondensed with 37% aqueous formaldehyde solution (120 ml, 1.5 mole) and stirred at 70° C. for 2 hours. Then further phenol (18 g, 0.2 mole) and formaldehyde (80 ml, 1 mole) were added in 250 ml of water and the mixture stirred and poured into 50/50 carbon tetrachloride/chlorobenzene (5 liter) and suspension polymerized with vigorous stirring at 120° C. under pressure. The resulting resin spheres were washed with alcohol and water and then soaked with dilute acid until no further soluble organic base remained, then washed with distilled water, ammonia and distilled water again.

EXAMPLE 5

Selectivity of the resin of Example 4 for mercury even in high salt concentrations was determined by the following test. A solution containing 1000 ppm of potassium, calcium and barium chlorides and 3,300 ppm of sodium as acetic acid/sodium acetate buffer (pH 4.50) was made up with 50 ppm of mercuric chloride. A 1 gm sample of the wet resin beads was added to 100 ml of this solution and equilibrated by stirring. Under these conditions the resin adsorbed 46 ppm of mercury and no other ion.

EXAMPLE 6

This example illustrates the preparation and properties of an ion exchange resin made in spherical beads crosslinked by an acid catalysed formaldehyde system.

Phenol (94.1 g, 1 mole), piperazine hexahydrate (196 g, 1 mole) in 50:50 aqueous ethanol (2 liter) were precondensed to linear polymer with formalin (37% aqueous formaldehyde solution) (120 ml, 1.5 mole) under Mannich reaction conditions (reflux for 3 hours). The linear polymer was then poured into 50:50 tetrachlorethylene/petroleum ether (B.p. 100°–120°) mixture containing polyvinyl alcohol (100 ml of 7.5% solution) as a surface active agent to form a well stirred suspension. Sulphuric acid catalyst (200 ml, 10%) and formalin (40 ml, 0.5 mole) were added and the suspension was heated to reflux while stirring and refluxed for 4 hours. The resulting resin spheres were treated as in Example 4.

EXAMPLE 7

This example illustrates the preparation and properties of a resin prepared from a substituted mono phenol (3-ethylphenol) and crosslinked with a different multifunctional di-phenol (4,4'-dihydroxydiphenylsulphide).

3-Ethylphenol (12.2 g, 0.1 mole) and 4,4'dihydroxydiphenylsulphide (4.4 g, 0.02 mole) were dissolved in ethanol (300 ml) and piperazine hexahydrate (22 g, 0.11 mole) was added slowly with stirring. After complete addition formalin was added (24 ml, 0.3 mole) and then stirred strongly for 24 hours at 110° C. in a pressure vessel. The resulting resin was washed with alcohol and water and then soaked in hydrochloric acid for 24 hours before being converted back to the base form.

This resin although more selective for copper than that in Example 1 had a capacity of only 0.3 millimole/gram.

EXAMPLE 8

This example illustrates the preparation and properties of a resin prepared from 4,4'-Bipiperidine and phenol crosslinked with 4',4'-Dihydroxydiphenylsulphone.

Phenol (42.3 g, 0.45 mole) and 4,4'-Dihydroxydiphenylsulphone (11.7, 0.05 mole) were dissolved in ethanol (1½ liters) and 4,4'-Bipiperidine (92.4 g, 0.55 mole) added with stirring. Formalin (120 ml, 1.5 mole) was then added slowly and the solution heated slowly to reflux with strong stirring. After 24 hours reflux the resulting resin was worked up as in Example 1.

This resin again was very selective for copper and mercury. The capacity for copper was 0.45 millimoles/gram.

What is claimed is:

1. A cross-linked, metal-chelating resin, selective for mercury and copper consisting of a polymer produced by the condensation of a phenolic component comprising one or more phenols, formaldehyde, and a diamino component consisting essentially of one or more di-(secondary amino) compounds under neutral conditions.

2. A resin as claimed in claim 1, wherein the diamino component comprises one or more di-(secondary amino) compounds in which each secondary amino group forms part of a saturated heterocyclic ring.

3. A resin as claimed in claim 2, wherein the amino component is piperazine or 4,4'-bipiperidine.

4. A resin as claimed in any one of claims 1 to 3, wherein the phenolic component comprises one or more compounds selected from the group consisting of hydroxybenzene and hydroxybenzenes having $C_1$ to $C_3$ alkyl substituents in the 3 and/or 3 and 5 positions.

5. A resin as claimed in claim 4, wherein the phenolic component is selected from the group consisting of hydroxybenzene and 3-ethyl-1-hydroxybenzene.

6. A resin as claimed in claim 1, wherein the phenolic component includes a bisphenol, bisphenol sulphide or bisphenol sulphoxide as a crosslinking agent.

7. A resin as claimed in claim 1, wherein the diamino component is piperazine and the polymer has the structure

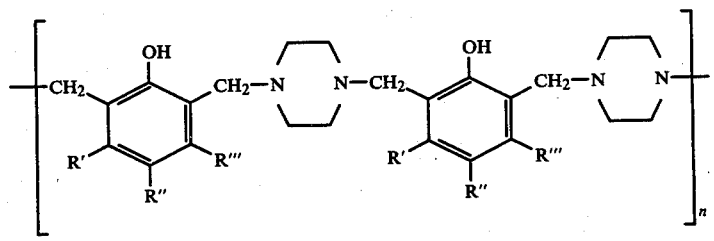

where R' and R''' are independently lower ($C_1$–$C_3$) alkyl groups or hydrogen atoms and R'' is a hydrogen atom or a cross-linking group.

8. A method for preparing a selective metal-chelating resin which comprises condensing approximately equimolar quantities of a phenolic component comprising one or more phenols, and a diamino component comprising one or more di-(secondary amino) compounds with approximately twice the molar quantity of formaldehyde under Mannich reaction conditions.

9. A method as claimed in claim 8, wherein the condensation is effected by refluxing the reactants in aqueous ethanol for about 24 hours.

10. A method for preparing cross-linked spherical beads of a selective metal chelating resin which comprises condensing about 1 mole of a phenolic component comprising one or more phenols with about 1.2 mole of a diamino component comprising one or more di-(secondary amino) compounds and about 1.5 moles of formaldehyde under neutral conditions, and condensing the linear precondensate polymer so produced with an additional quantity of the same or another phenolic component and a further 1 mole of formaldehyde, under suspension polymerisation conditions.

11. A method as claimed in claim 10, wherein the first condensation is carried out by heating the reactants in aqueous alcohol at about 70° C. for about 2 hours and second condensation is carried out by dispersing the linear polymer in chlorobenzene/carbon tetrachloride in the presence of a surfactant and heating the mixture with vigorous stirring at about 120° C. for 3 hours.

12. A method for the selective removal of copper and/or mercury from an aqueous solution which comprises contacting the solution with a resin as claimed in claim 1.

* * * * *